United States Patent
Snoke

(10) Patent No.: US 10,054,257 B1
(45) Date of Patent: Aug. 21, 2018

(54) COLLAPSIBLE CURVED SUPPORT TRACK SYSTEM FOR CAMERA SLIDER DOLLY

(71) Applicant: American Grip Inc., Sun Valley, CA (US)

(72) Inventor: Lance Alan Snoke, Sun Valley, CA (US)

(73) Assignee: American Grip Inc., Sun Valley, CA (US)

( * ) Notice: Subject to any disclaimer, the term of this patent is extended or adjusted under 35 U.S.C. 154(b) by 0 days.

(21) Appl. No.: 15/665,530

(22) Filed: Aug. 1, 2017

(51) Int. Cl.
*F16M 11/42* (2006.01)
*G03B 17/56* (2006.01)
*B66F 11/04* (2006.01)

(52) U.S. Cl.
CPC ......... *F16M 11/425* (2013.01); *B66F 11/048* (2013.01); *G03B 17/561* (2013.01)

(58) Field of Classification Search
CPC .. F16M 11/425; F16M 11/20; F16M 11/2085; F16M 11/24; F16M 11/045; B66F 11/048; G03B 17/561
See application file for complete search history.

(56) References Cited

U.S. PATENT DOCUMENTS

| 4,943,821 A * | 7/1990 | Gelphman | G03B 37/02 396/24 |
| 2009/0266905 A1* | 10/2009 | Rosen | E01B 23/00 238/10 R |

OTHER PUBLICATIONS

Chet Simmons, "Getting the shot: New Curved Track for Dana Dolly at JR Lighting Las Vegas", Oct. 27, 2015, http://lighting-griplasvegas.blogspot.com/2015/10/getting-shot-new-curved-track-for-dana.htnnl (Year: 2015).*

* cited by examiner

*Primary Examiner* — Nelson D. Hernández Hernández
(74) *Attorney, Agent, or Firm* — Kelly & Kelley, LLP

(57) ABSTRACT

A collapsible curved support track system for a camera slider dolly includes a plurality of curved inner and outer rail segments each having an outer configuration enabling a first set of rollers of the camera slider dolly to smoothly roll thereon. Connectors disposed within adjacent open ends of the inner and outer rail segments enable manual detachable connection between inner rail segments to form a curved inner rail and a curved outer rail. Supports in spaced relation support the inner and outer rails to form a generally parallel curved track. The supports have mounts configured to removably receive a portion of the inner rail or outer rail. A plurality of the mounts are adjustable to enable adjustment of the inner or outer rails associated therewith.

21 Claims, 11 Drawing Sheets

US 10,054,257 B1

COLLAPSIBLE CURVED SUPPORT TRACK SYSTEM FOR CAMERA SLIDER DOLLY

BACKGROUND OF THE INVENTION

The present invention generally relates to camera dollies and tracks for supporting camera dollies. More particularly, the present invention relates to a curved support track system for a camera slider dolly which is collapsible and includes adjustable support mounts to enable adjustment of the inner and outer rails of the track.

A camera dolly is a wheeled cart or similar device used in film making and television production to create smooth horizontal camera movements, which would otherwise be a still shot. A camera is mounted to the dolly and the camera operator and/or assistant ride on the dolly or push the dolly back and forth to obtain the desired footage and shot.

The camera dolly is generally used to produce images which involve moving the camera toward or away from a subject, or generally parallel to a subject, such as a moving subject, while a take is being recorded, a technique known as a "dolly shot". The camera dolly may be used as a shooting platform on any surface, but is often raised onto a track to create smooth movement on a horizontal axis known as a tracking shot. The best way to be able to replicate the same camera movement for multiple takes, which can be important for editing, is to use a dolly on a track.

Studio dollies are large and stable and can feature hydraulics and motors. These are the first choice for studio, back lot and location shoots when using professional cameras. A studio dolly usually needs a specialized operator called a "dolly grip", and many are built for the camera operator to ride on the dolly with the camera.

Lightweight dolly systems are more simple, affordable and best used with lighter-weight cameras. Typically, these dollies support only the camera and the operator needs to move alongside. These lightweight dollies are often referred to as "slider dollies" as rotatable wheels or sliders engage the track and rotate along the track as it is moved by the operator. One such slider dolly is known as a "Dana Dolly", which is a portable dolly system which is designed to be simple, practical, flexible and affordable. The portable dolly system is easy to set up and particularly useful for instances where the cameraman wants to do a fairly small dolly move, without a lot of setup.

Typically, the tracks for such slider dollies are comprised of two straight rails having cross members extending therebetween to space the rails from one another and form a track. The cross members may be pivotally attached to the straight rails such that the rails can be moved relative to one another so as to increase or decrease the distance therebetween. Curved tracks are also used, wherein rails having a length of ten feet or greater are disposed relative to one another to form a track.

However, these curved tracks have drawbacks. It can be difficult to adjust the spacing between the tracks to match the distance between the wheels of the slider dolly so that the slider dolly can be smoothly operated thereon. Moreover, the currently used tracks are not collapsible and the length thereof prohibit them from being transferred by means of small vehicles or being checked onto an airplane with other baggage and the like. Instead, these tracks must be transported in larger vans or trucks or must be shipped from location to location. This is a fairly significant drawback as it is not uncommon in the film industry to move from location to location from day to day or week to week. It is inconvenient and costly to ship the curved tracks from one filming location to another. This can also create delays in filming as the shipping of the curved track can take longer than the film crew travelling from one filming location to another. Independent or smaller filmmakers may not have large vehicles to transport the tracks and shipping the tracks can become a financial burden.

Accordingly, there is a continuing need for a curved support track system for a camera slider dolly having a plurality of rail segments which can be selectively attached to one another so that the track system is collapsible. There is also a continuing need for such a curved support track system having mounts which are adjustable to enable adjustment of the inner and outer rails of the track. There is also a continuing need for a collapsible curved support track system which enables the camera slider dolly to smoothly roll on the assembled track. The present invention fulfills these needs, and provides other related advantages.

SUMMARY OF THE INVENTION

The present invention resides in a collapsible curved support track system for a camera slider dolly. The system comprises a plurality of curved inner rail segments having an outer configuration enabling a first set of rollers of a camera slider dolly to smoothly roll thereon. A plurality of curved outer rail segments also have an outer configuration enabling a second set of rollers of the camera slider dolly to smoothly roll thereon. The inner and outer rail segments each comprise a smooth, generally arcuate surface for receiving the slider dolly rollers thereon.

Connectors are disposed within adjacent open ends of the inner rail segments and adjacent open ends of the outer rail segments to manually detachably connect the inner rail segments to one another to form a curved inner rail and manually detachably connect the outer rail segments to one another to form a curved outer rail. The connectors comprise a male connector manually insertable into a female connector of an adjacent rail segment. Each male connector includes a spring-loaded pin and each female connector includes a recess for receiving the spring-loaded pin therein.

A plurality of supports are in spaced relation to one another for supporting the inner and outer rails to form a generally parallel curved track. The supports may include or be attached to a height adjustable stand. The stand has a ground-engaging base at one end thereof and is coupled to the support at a generally opposite end thereof.

At least one support has first mounts configured to removably receive a portion of the inner rail, and second mounts spaced from the first mounts and configured to removably receive portions of the outer rail. The first and second mounts are spaced apart from one another so as to arrange the inner rail in generally parallel spaced relation to the outer rail a distance corresponding to a distance between the spaced apart first and second rollers of the camera slider dolly. The support includes first and second mounts which are adjustable to enable adjustment of the inner or outer rails associated therewith. The support typically comprises a beam having first and second spaced apart crossbars positioned generally parallel to one another corresponding to a distance between the inner and outer rails. The first crossbar supports the first inner rail mounts thereon and the second crossbar supports the second outer rail mounts thereon. At least a plurality of the first and second mounts are capable of rotational and planar movement to enable adjustment of the inner or outer rails. A centering mount is disposed between adjustable mounts in fixed position with respect to the support.

The mounts include a generally V-shaped, open-faced recess for receiving a portion of the rail segment therein. A bolt extends through the adjustable mounts and into a threaded aperture of the rail segment to attach the rail segment to the mount. A handle may be formed at an end of the bolt for manually fastening the bolt and rail to one another.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

As shown in the accompanying drawings, for purposes of illustration, the present invention resides in a curved support track system 10 for camera slider dollies. The support track system 10 of the present invention is collapsible so as to be easily transported and stored, and is also adjustable so that the camera slider dolly smoothly rolls thereon when assembled.

Figure 1:
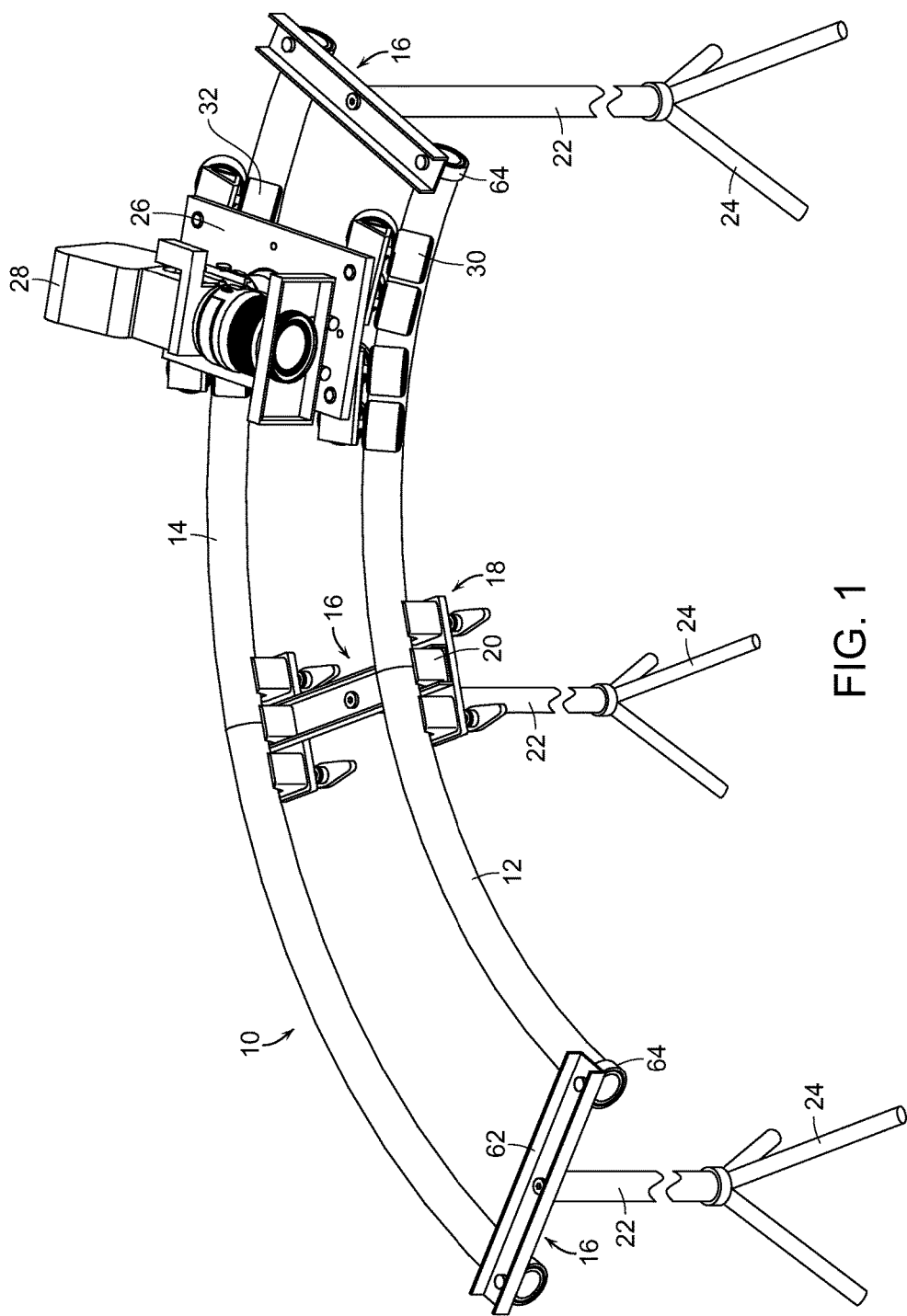
FIG. 1 is a perspective view of a collapsible curved support track system embodying the present invention having a slider dolly and camera positioned thereon.
Figure 2:
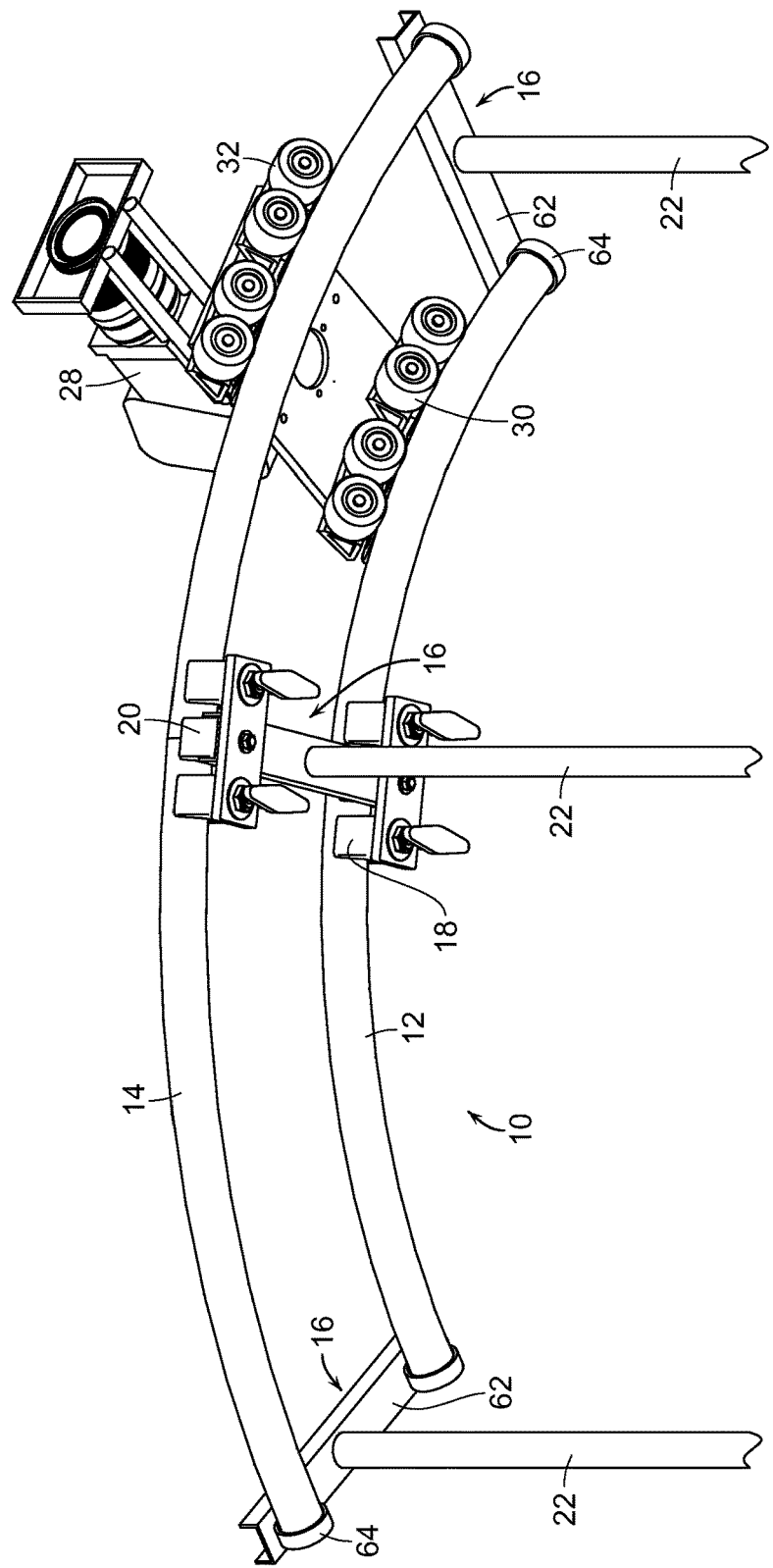
FIG. 2 is a bottom perspective view of the track system and camera slider dolly of FIG. 1.

With reference to FIGS. 1 and 2, the track system 10 of the present invention resides in an inner rail 12 and an outer rail 14, which are collapsible as will be more fully illustrated and described herein, and a plurality of supports 16 are in spaced relation for supporting the inner and outer rails 12 and 14 to form a generally parallel curved track. At least one of the supports 16, as illustrated the middle support 16, includes mounts 18 and 20 configured to removably receive a portion of the rails 12 and 14. A plurality of the mounts 18 are adjustable so as to enable adjustment of the inner and outer rail 12 or 14 associated therewith so as, for example, to adjust the spacing or distance between the inner and outer rails 12 and 14, to create the desired curvature of the track, etc.

The support 16 may be disposed on stands 22 which have a ground-engaging base 24 at one end thereof and the support 16 at a generally opposite end thereof. The stands 22 may be detachably connected to the support 16, such as by a post of the support 16 being removably inserted into an open upper end of a slightly larger post of the stand 22. The stand 22 may have a tripod base 24 so as to accommodate uneven ground and be collapsible and expandable to assist in the transportation and storage of the stands 22. Moreover, the stands 22 may be adjustable in height so as to raise or lower the height of the support 16, and thus the rails 12 and 14 forming the track to a desired height.

Figure 3:
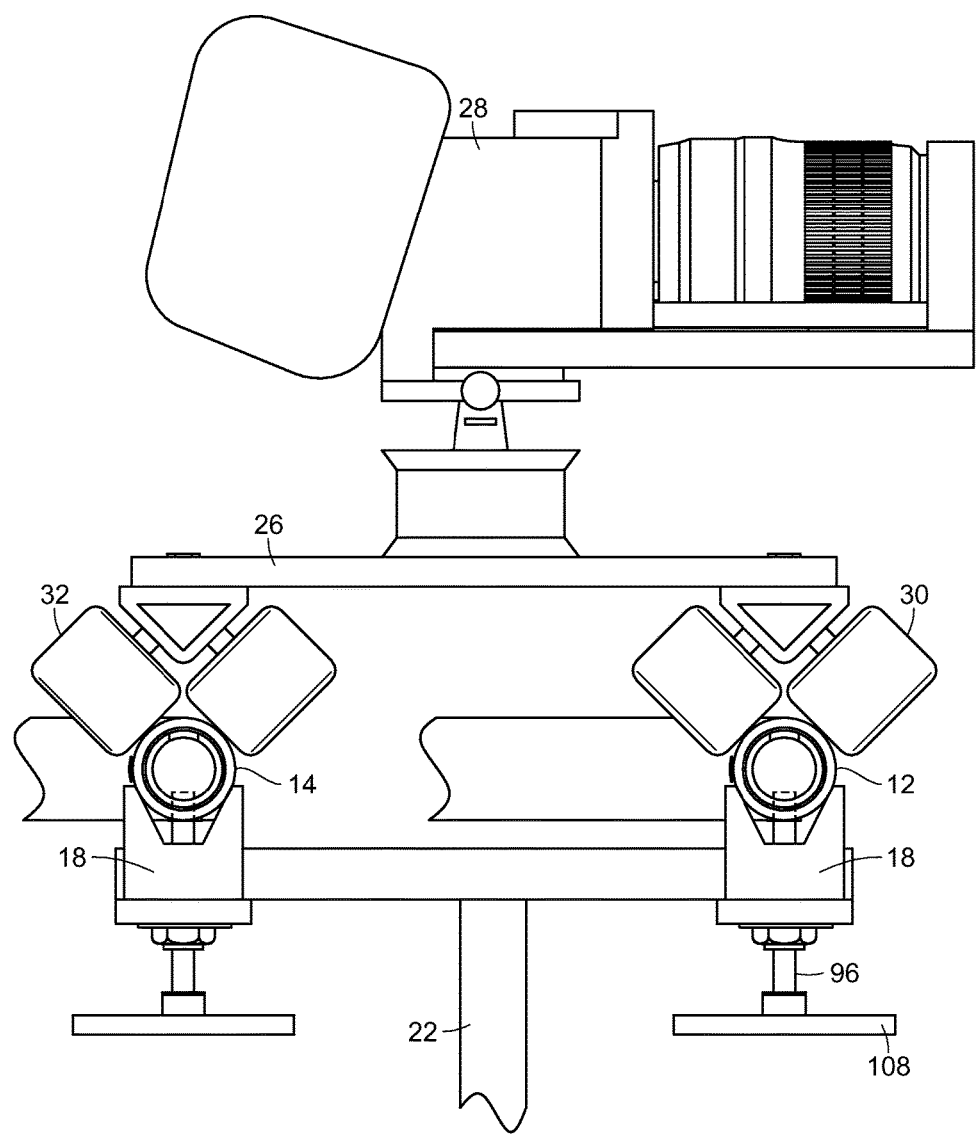
FIG. 3 is an end view of the track system of the present invention, illustrating a camera slider dolly operably disposed thereon, in accordance with the present invention.

With reference to FIGS. 1-3, the track system 10 of the present invention is configured and designed for use with a slider dolly 26, such as a Dana Dolly™, which removably supports a filming camera 28 thereon. The dolly 26 has a first set of rollers or wheels 30 and a second set of rollers or wheels 32. The sets of rollers 30 and 32 are spaced apart from one another a given distance. As can be shown in FIGS. 1-3, the sets of rollers 30 and 32 are configured to slidably move and roll along an upper arcuate surface of the rails 12 and 14. The rails 12 and 14 are spaced apart from one another a distance corresponding to the distance between the first and second sets of rollers 30 and 32 of the dolly 26. The rails 12 and 14 are typically approximately 1.25 inch in diameter so that the sets of rollers 30 and 32 can smoothly roll thereon. The mounts 18 and 20 enable the adjustment of the tracks 12 and 14 to be the proper curvature as well as distance apart from one another so that the slider dolly 26 smoothly rolls thereon. Moreover, the individual rail segments are connected in such a manner such that the junction thereof does not present an obstacle or otherwise create bumps or an irregular surface area that would otherwise cause the sets of rollers 30 and 32 to not smoothly roll across the junction of the attached rail segments.

Figure 4:
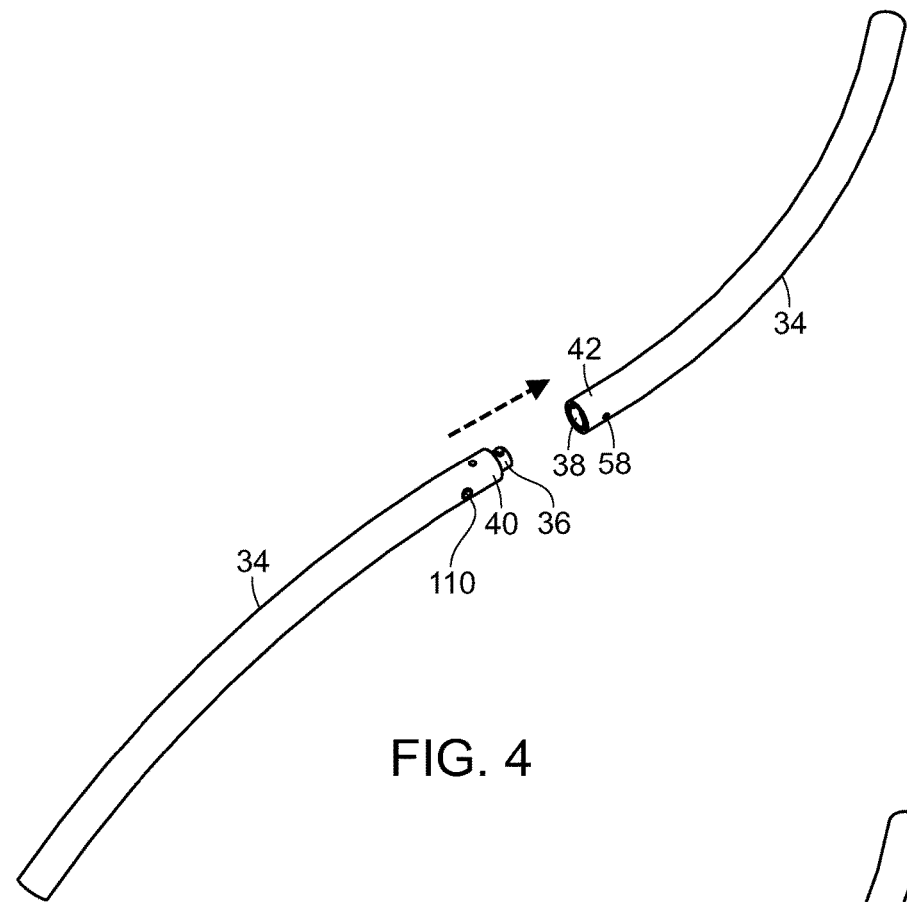
FIG. 4 is a perspective view of rail segments used in accordance with the present invention.
Figure 5:
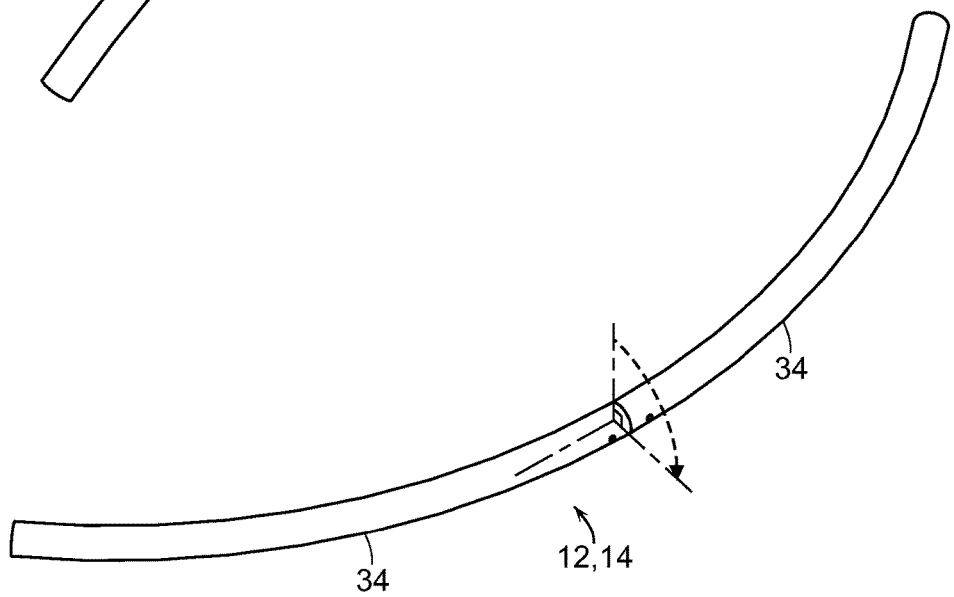
FIG. 5 is a perspective view illustrating the rail segments of FIG. 4 connected to one another, in accordance with the present invention.

With reference now to FIGS. 4 and 5, the inner and outer rails 12 and 14 are each comprised of a plurality of curved rail segments 34. Each rail segment 34 comprises a smooth, generally arcuate surface for receiving the slider dolly rollers 30 or 32 thereon. The rail segments 34 may be comprised of 1.25 inch pipe. Typically, the pipe is comprised of metal, such as steel, but more preferably aluminum, which provides durability and is relatively lightweight. In accordance with the present invention, the rail segments 34 are of a length which enable them to be easily transported from location to location and stored. For example, the rail segments 34 are preferably of a size such that they can be checked on for an airline flight, similar to skis, golf clubs and the like. As such, the rail segments 34 are several feet in length, such as four to seven feet in length, and typically approximately five feet in length. It will be appreciated that the length can vary, but it has been found that a rail segment 34 of approximately five feet in length is capable of being easily moved, transported, checked into baggage of airlines, and yet quickly, easily and conveniently forming a semi-circular or even circular track as needed by the filming crew. For example, two five-foot inner segments and outer segments can be joined to one another to create a semi-circular track which is approximately eight to ten feet in diameter. The length and the curvature of the rail segments 34 can be varied in order to create semi-circular and circular tracks of various diameters, although track segments 34 which are short require additional time and labor of assembly and disassembly and rail segments 34 which are too long cannot be easily transported or stored. It is particularly important, however, that the assembled rail segments 34 form inner and outer rails 12 and 14 forming a curved track which can support a camera slider dolly which smoothly rolls thereon.

With reference now to FIGS. 4 and 5, connectors 36 and 38 are disposed within adjacent open ends 40 and 42 of the rail segments 34 which enable the manual detachable connection of the rail segments 34 to one another to form either a curved inner rail 12 or a curved outer rail 14, as illustrated in FIG. 5. Connector 36 is typically a male connector which is insertable into a corresponding female connector 38, and the rail segments 34 twisted relative to one another so as to lock the connectors 36 and 38 to one another, and thus the adjacent rail segments 34 to one another.

Figure 6:
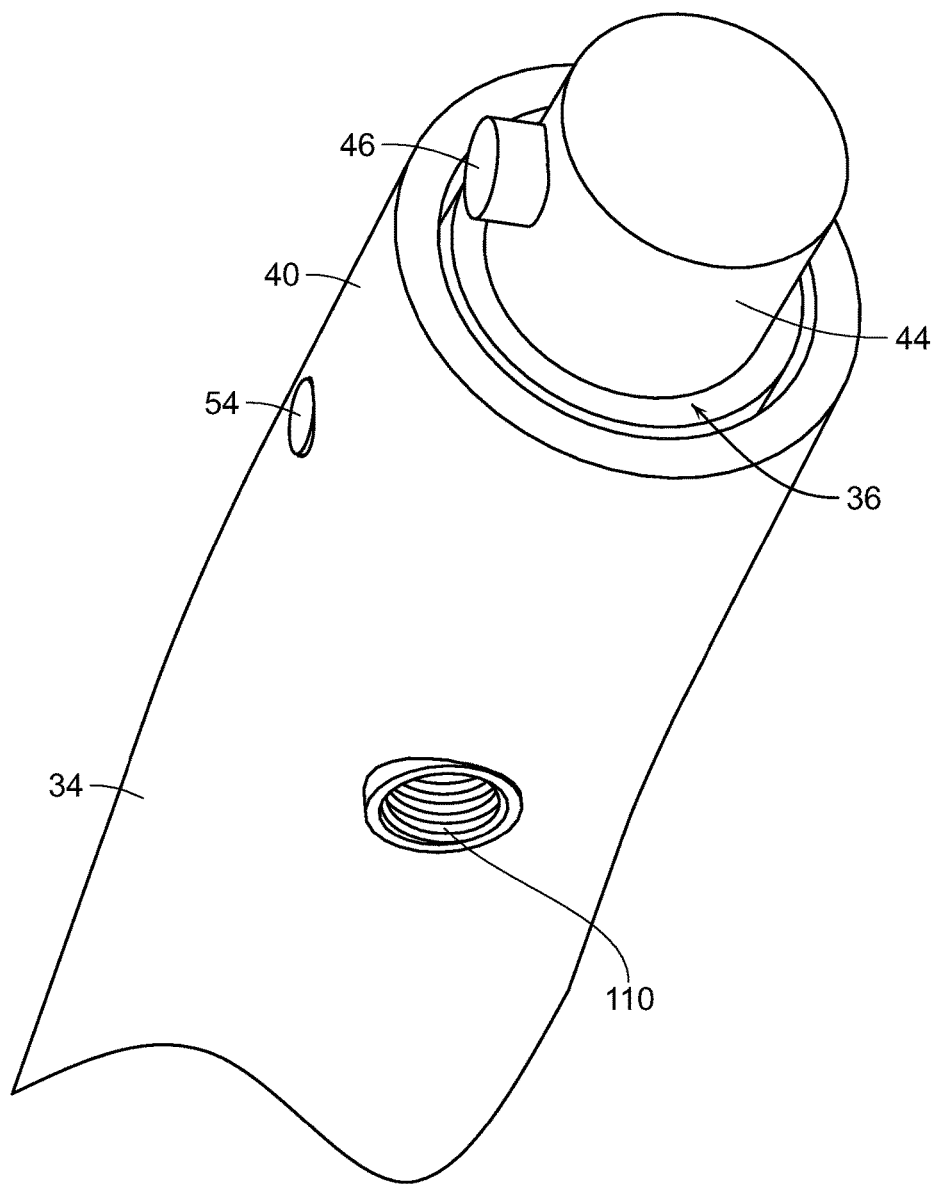
FIG. 6 is an enlarged perspective view of an end of a rail segment having a male connector used in accordance with the present invention.
Figure 7:
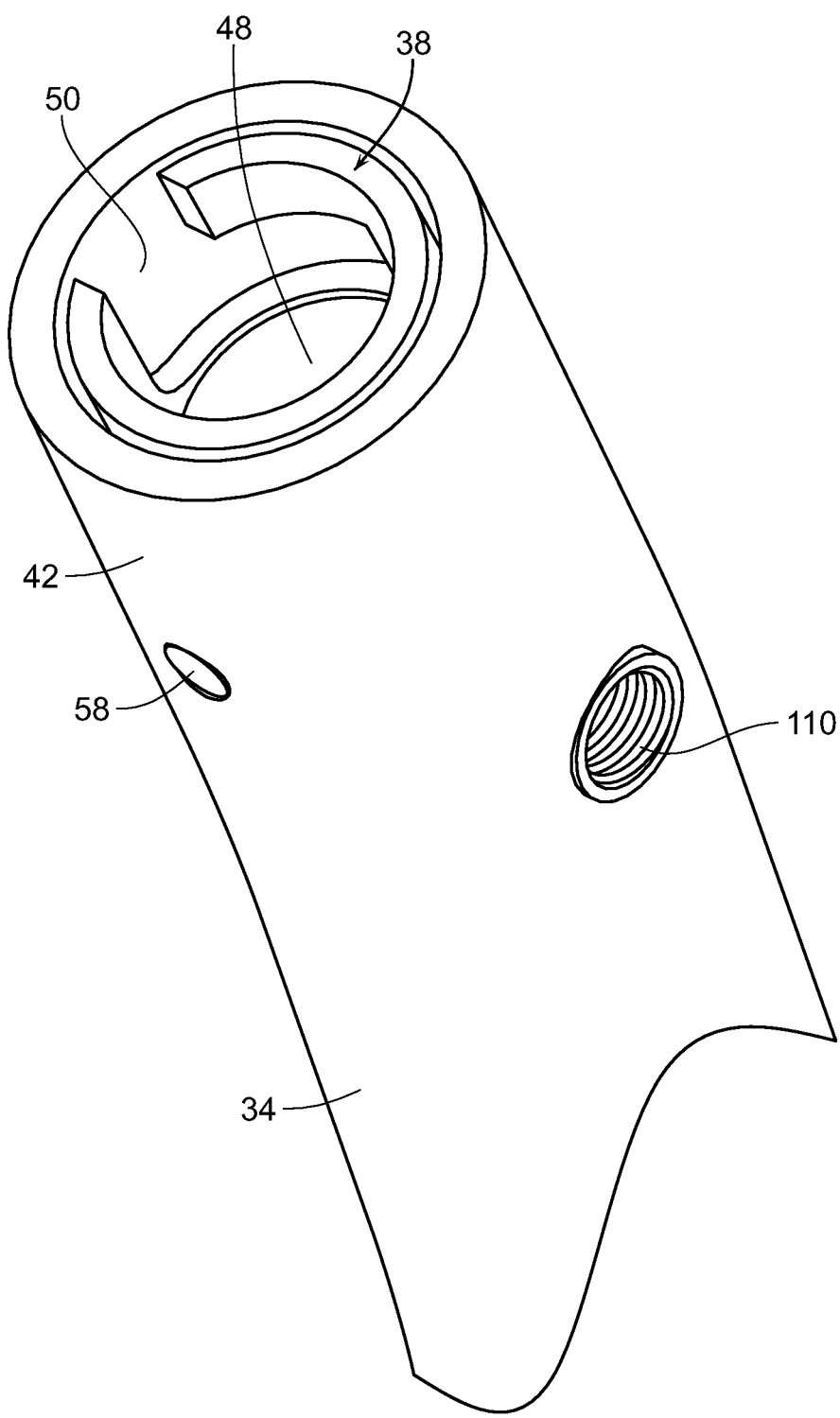
FIG. 7 is a perspective view of an end of a rail segment having a female connector, used in connection with the present invention.
Figure 8:
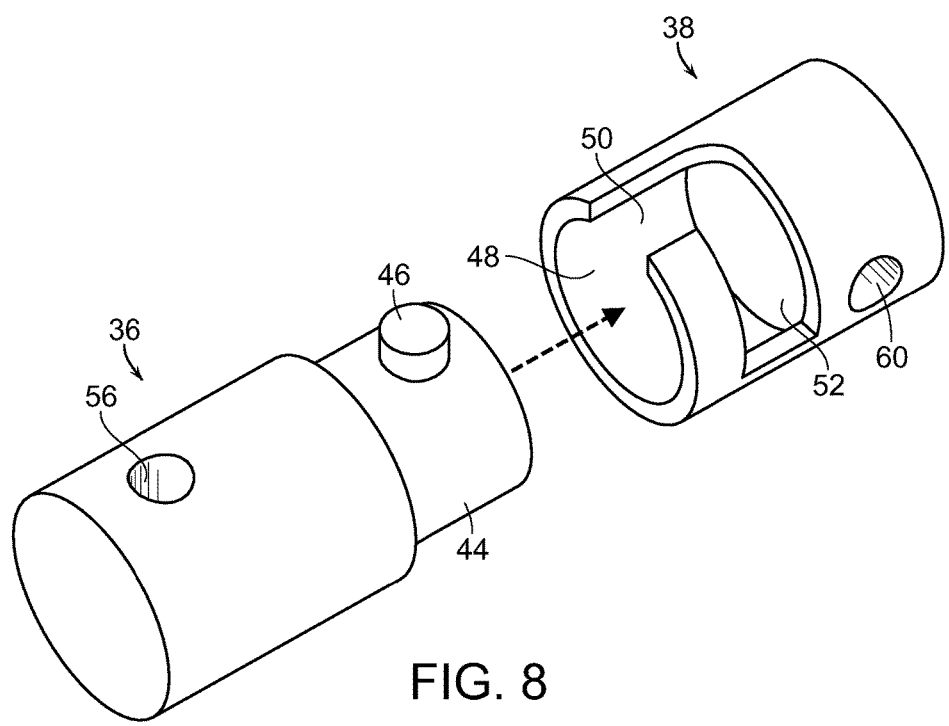
FIG. 8 is a side perspective view illustrating a male and a female connector used in accordance with the present invention.
Figure 9:
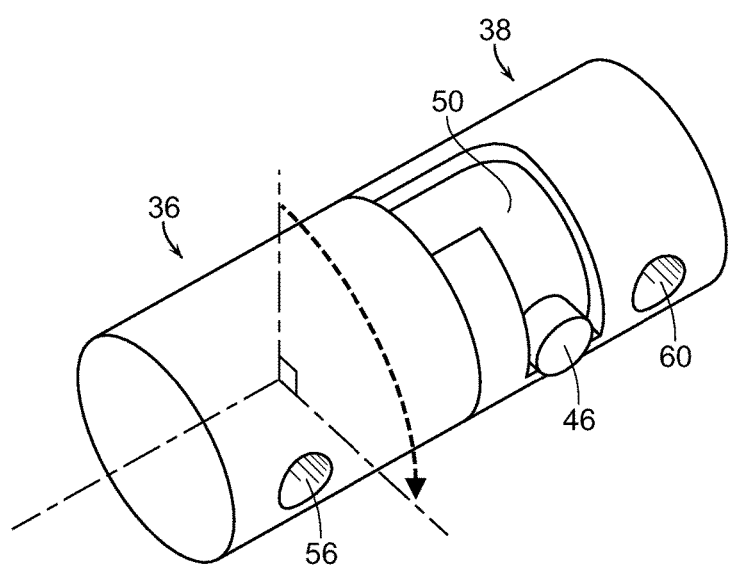
FIG. 9 is a perspective view similar to FIG. 8, illustrating the male connector inserted into the female connector and moved into a locked position, in accordance with the present invention.

With reference now to FIGS. 6 and 7, enlarged perspective views illustrate the open adjacent ends 40 and 42 of rail segments 34 to be joined to one another. The male connector 36 includes a post portion 44 extending outwardly therefrom and having a spring-loaded pin 46 extending outwardly therefrom at a normal angle. As illustrated in FIG. 7, the female connector 38 includes a cavity 48 for receiving the post 44 of the male connector 36 and a recess 50 for receiving the spring-loaded pin 46 therein. As illustrated in FIGS. 7-9, the recess 50 is generally L-shaped so that the pin 46 is insertable into an open end of the recess and movable into a generally closed end thereof, by twisting the adjacent rail segments 34 so as to lock the male and female connectors 36 and 38 to one another. It will also be understood that pin 46 would normally extend above an outer surface of the female connector 38, as illustrated in FIG. 9. However, with the female connector disposed within the open end 42 of the rail segment 34, as illustrated in FIG. 7, the spring-loaded pin 46 is pressed inwardly into post 44 as the male connector 36 is inserted into the female connector 38, and more particularly spring-loaded pin 46 is inserted into the recess 50 of the female connector 38, the pin 46 being pushed inwardly due to its contact with the inner surface of the open end 42 of the rail segment 34. Thus, a detent is formed between the male and female connectors 36 and 38 which more securely fastens these connectors 36 and 38, and thus the adjacent rail segments 34 to one another. With the pin 46 being positioned at the closed end 52 of the recess 50 and the pin 46 applying outward pressure to an inner surface of the open end 42 of the rail segment 34, the male and female connectors 36 and 38 are locked with respect to one another and the adjacent rail segments 34 are held firmly in place and connected to one another.

FIGS. 8 and 9 illustrate the male and female connectors 36 and 38 outside of the ends 40 and 42 of the rail segments 34. It will be understood, as shown in FIGS. 6 and 7, that the connectors 36 and 38 are at least partially disposed within the open ends 40 and 42 of the rail segments 34. The connectors 36 and 38 can be held in place by a variety of means, but as illustrated are held in place by a pin (not shown) extending through aligned apertures 54 and 56 of the rail segment 34 and male connector 36 and aligned apertures 58 and 60 of the adjacent rail segment 34 and female connector 38. However, other means, such as adhesive, welding or the like may be used in order to properly insert the connectors 36 and 38 into the open ends 40 and 42 of the rail segments 34. The arrangement illustrated herein of having the female connector 38 recessed within the open end 42 of a rail segment and the male connector 36 having only the male projection post 44 and spring-loaded pin 46 extending therefrom outside of the end of the rail segment 34, which is insertable into corresponding cavities and recesses 48 and 50 of the female connector 38 enable the rail segments 34 to be connected to one another to form a very tight connection with a very small to non-existent gap between the adjoined rail segments 34, so as to ensure a generally smooth and continuous rail surface which the rollers 30 and 32 of the slider dolly 26 can slide over without bumps or interruption, which would adversely affect the shot. Such a tight junction can be seen in FIGS. 1 and 5, in particular.

It will be understood that in order to disassemble and collapse the inner or outer rails 12 or 14, adjacent track segments 34 merely need to be grasped and twisted relative to one another such that the spring-loaded pin 46 is moved from the closed end 52 of recess 50 into the open end segment thereof and the rail segments 34 then pulled apart from one another, essentially taking the exact opposite steps of assembling and connecting the adjoining rail segments 34 to one another. This can be done manually without training or the need of any tools in a very quick and convenient manner in order to both assemble and disassemble the adjacent rail segments 34 to one another to form either the inner or outer rail 12 or 14.

With reference again to FIGS. 1 and 2, it is seen that there are a plurality of supports 16 for supporting the inner and outer rails 12 and 16 in spaced apart relationship to one another. As illustrated, the outermost supports 16 may comprise a beam 62 having retainers 64 for holding and retaining ends of the inner and outer tracks 12 and 14. The beam 62 has a length approximating the desired distance between the inner and outer rails 12 and 14, which corresponds to the distance between the sets 30 and 32 of the rollers of the slider dolly 26. However, at least one of the supports 16, typically one or more supports intermediate the ends of the rails 12 and 14 have mounts 18 and 20 thereon which are configured to removably receive a portion of the inner or outer rail 12 or 14, as illustrated in these figures.

Figure 10:
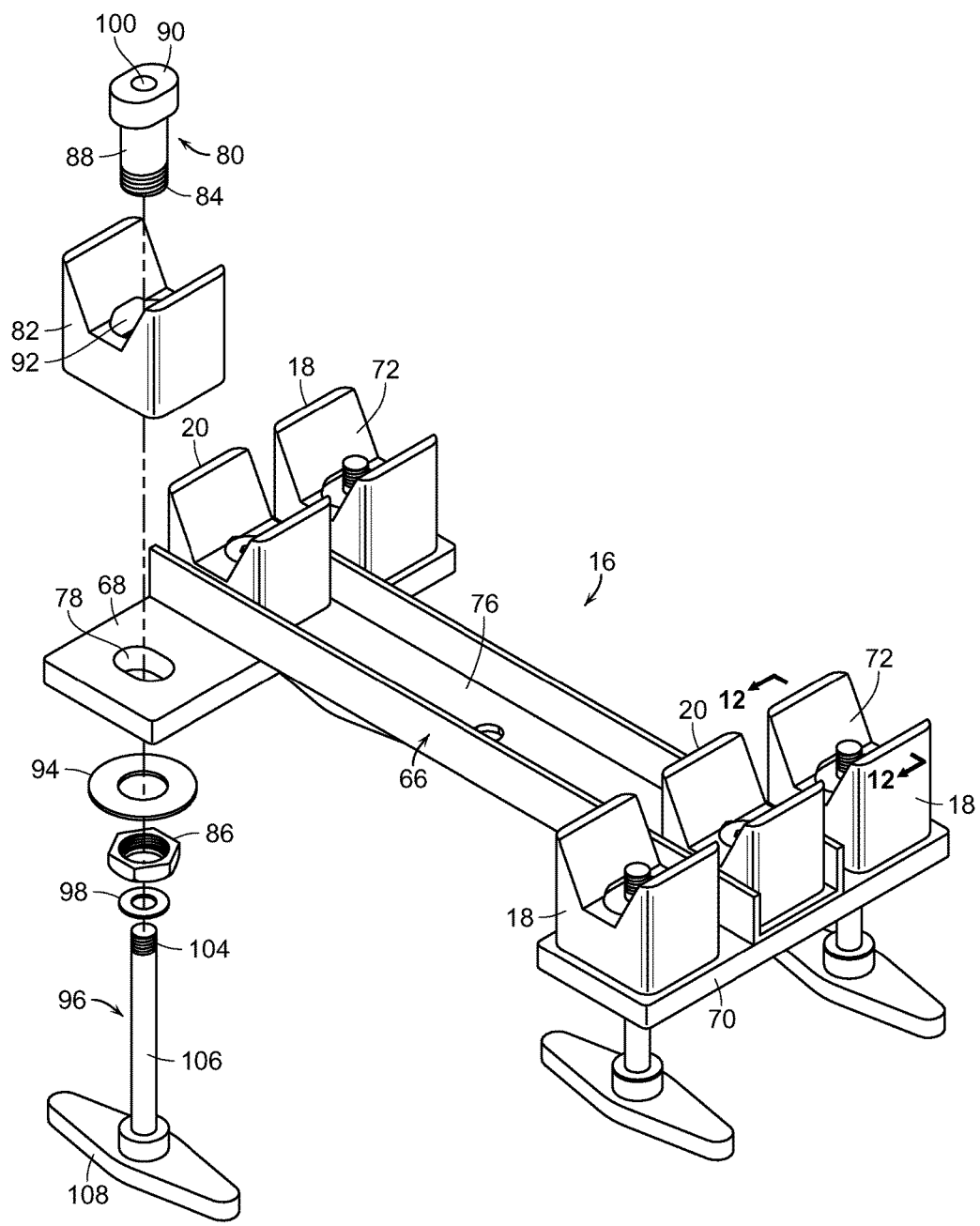
FIG. 10 is a partially exploded perspective view of a rail support used in accordance with the present invention, illustrating component parts of an adjustable mount thereof.
Figure 11:
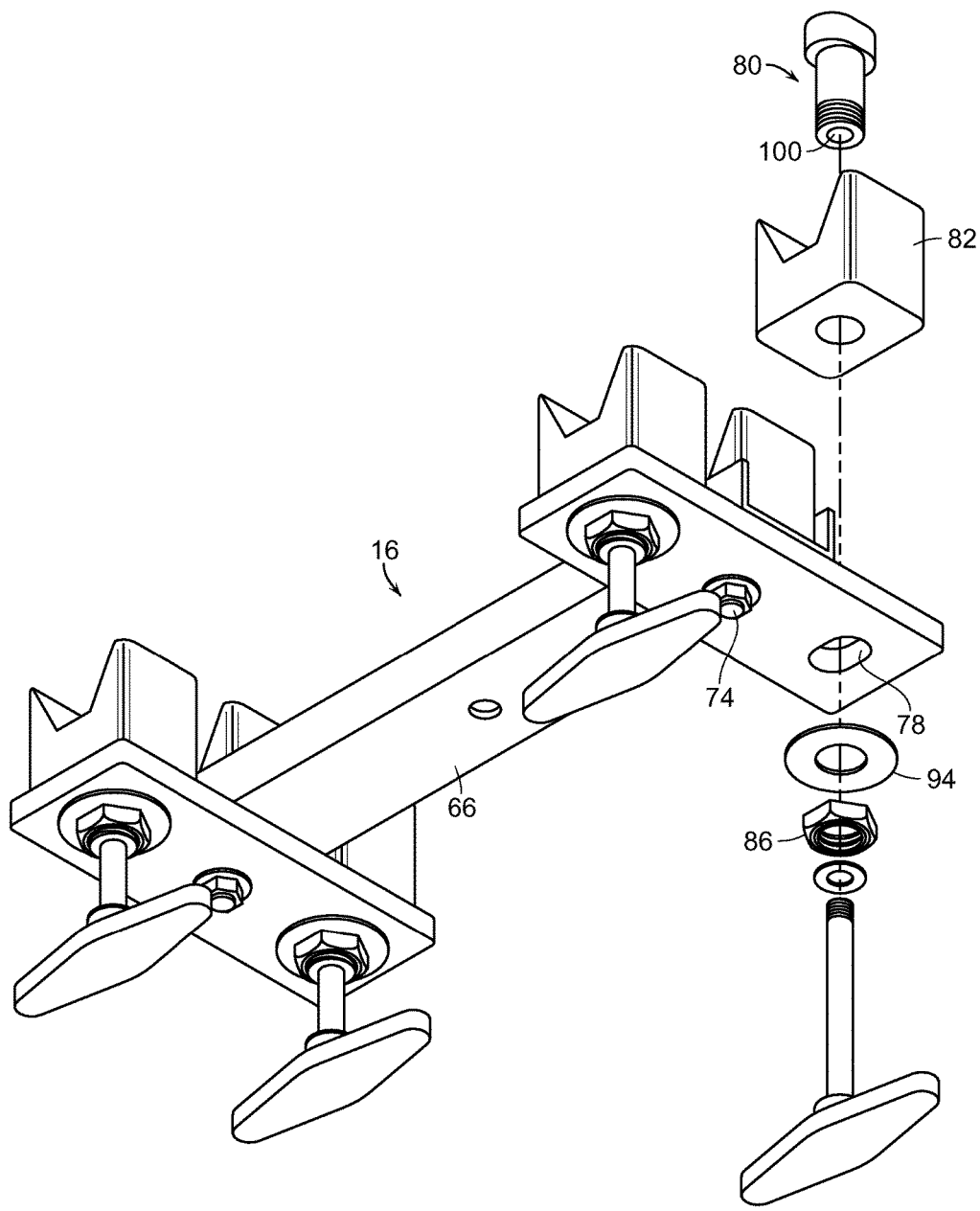
FIG. 11 is a bottom perspective view of the support of FIG. 10.
Figure 12:
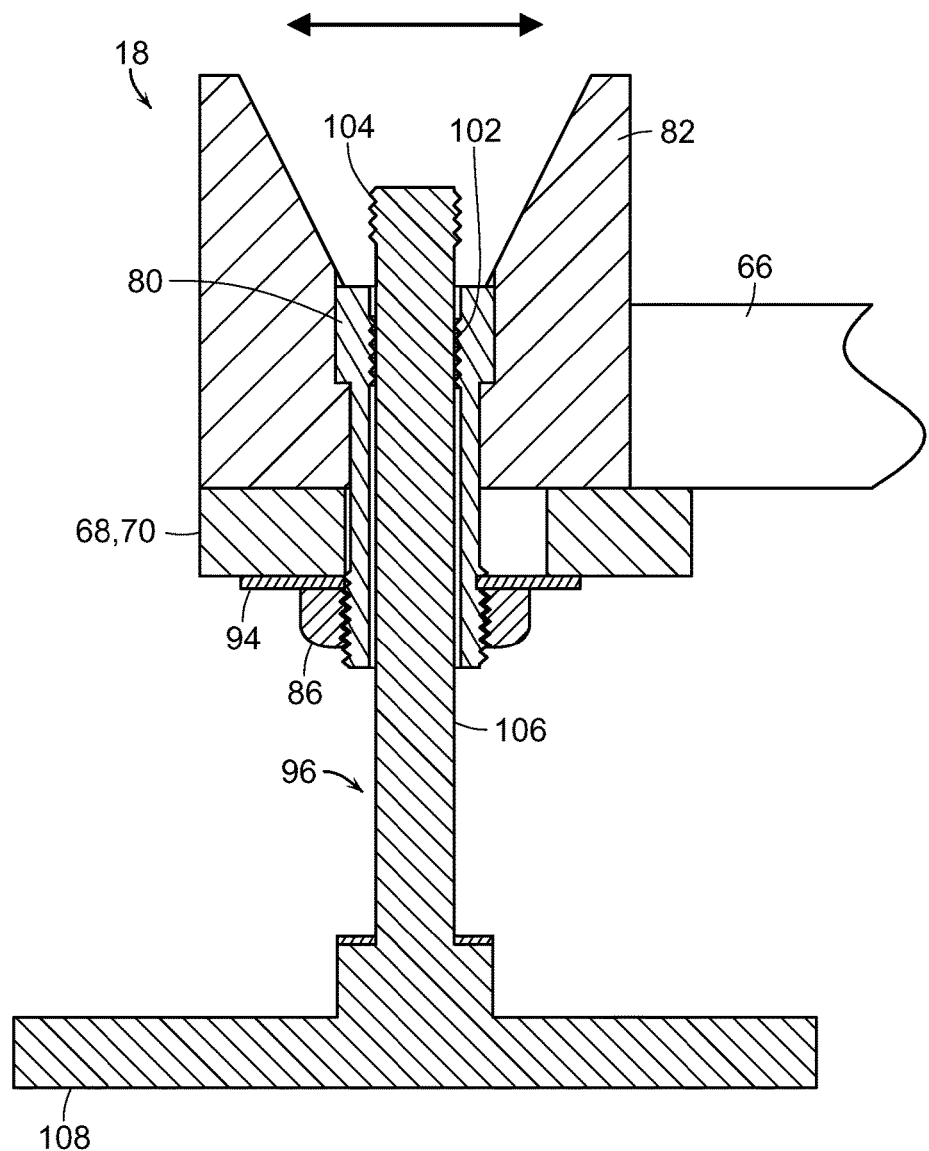
FIG. 12 is a cross-sectional view taken generally along line 12-12 of FIG. 10, illustrating the component parts of an adjustable mount used in accordance with the present invention.

With reference now to FIGS. 10-12, an inner or adjustable support 16 is shown. It also includes a beam 66 which is typically approximately the desired distance between the inner and outer rails 12 and 14. However, it also includes spaced apart crossbars 68 and 70 which are attached to the beam 66 and are generally parallel to one another, such that the beam 66 and the crossbars 68 and 70 have a generally I-configuration. The crossbars 68 and 70 are spaced apart from one another approximately the desired distance of the spacing between the inner and outer rails 12 and 14.

A plurality of rail-receiving mounts 18 and 20 are attached to each crossbar 68 and 70. A first set of the mounts is disposed on the first crossbar 68 so as to removably receive the inner rail 12, wherein the second set of mounts 18 and 20 are disposed on the second crossbar 70, and intended to removably receive the outer rail 14 therein. At least a plurality of the mounts 18 are adjustable, as will be more fully described herein, so as to enable the easy and convenient adjustment of the inner and outer rails 12 and 14 so as to properly position these rails 12 and 14 so that they can properly receive the sets of rollers 30 and 32 of the slider dolly 26 thereon. Typically, a central mount 20 is fixed so as to not rotate or slide, whereas the mounts 18 disposed on either side of the fixed mount 20 are adjustable and capable of slidable horizontal or planar movement as well as rotational movement. As can be seen in FIGS. 1 and 2, the fixed, central mount 20 receives the rails 12 and 14 at the junction between the rail segments. The fixed nature of the mount 20 serves to hold the junction between the rail segments in place and also self-centers the rails 12 and 14.

In a particularly preferred embodiment, as illustrated, the mounts 18 and 20 all include a generally V-shaped, open-faced recess 72. A recess is needed for the bottom portion of the rails 12 and 14 to be inserted into the mounts 18 and 20. It has been found that the V-shaped recess configuration is particularly advantageous in that there will always be two points of contact between the rail 12 or 14 and the mount 18 or 20, as illustrated in FIG. 3. These two points of contact are generally opposite one another in order to firmly hold the rail 12 or 14 in place. While a generally U-shaped recess could be used, it has been found that the outer surface of the rail 12 or 14 may only contact a bottom surface or one of the side inner surfaces of the recess, instead of two generally opposite points of contact with the V-shaped recess configuration of the preferred embodiment. It will be understood that the recess 72 has a depth enabling a lower portion of the rail 12 or 14 to be inserted therein, while still providing sufficient top surface area for the sets of rollers 30 and 32 of the slider dolly to engage, as illustrated in FIG. 3.

With continuing reference to FIGS. 10 and 11, the centering mount 20 is firmly and fixedly attached in place to the crossbar 68 or 70 and/or beam 66, such as by means of a fastener 74 extending therethrough. The fastener may comprise a bolt and nut, wherein the bolt head is preferably recessed into the mount so as to not contact the rail 12 or 14. The beam 66 may form a channel, such as comprising angle iron or the like, such that the centering or central mount 20 can be disposed within the channel 76 formed by the beam.

Figure 13:
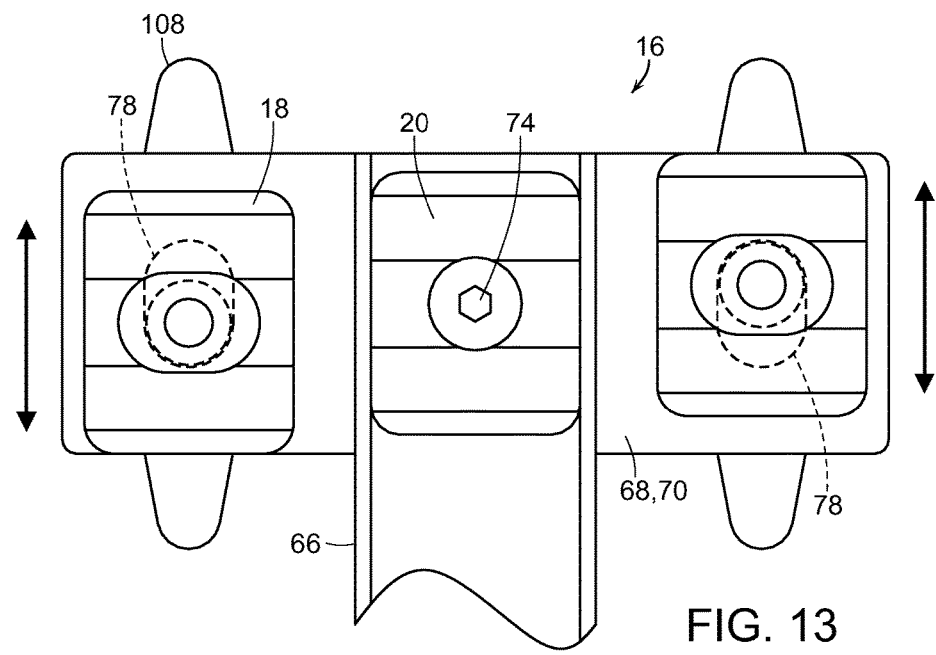
FIG. 13 is a top view of the support, illustrating slidable adjustability of the adjustable mounts of the support.

With continuing reference to FIGS. 10 and 11, apertures 78 are formed on either side of the centering mount 20 within the crossbar 68 or 70 for attachment of the adjustable mounts 18. The aperture 78 is oval, or otherwise elongated, to provide horizontal or planar sliding motion of the adjustable mounts 18 such that the adjustable mounts on the respective crossbars 68 and 70 can be moved towards or away from one another, and thus serve to slightly adjust the distance between the adjustable mounts on the crossbeams 68 and 70 and slightly adjust the distance therebetween so as to adjust the distance between the inner and outer rails 12 and 14. This is shown in FIG. 13, where it can be seen that the adjustable mounts 18 can be moved within the elongated aperture 78 so as to move the mount 18 towards an outer edge of the support or inwardly within the support 16. This could be done, for example, after the inner or outer rail is inserted into the mounts, and attached thereto, the adjustable mounts 18 can be moved, as necessary, in order to move the rail 12 or 14 inwardly or outwardly.

With reference now to FIGS. 10-12, a bolt 80 extends through a top of the mount block 82, through elongated aperture 78 of crossbar 68 or 70. A threaded end 84 of the bolt 80 is threadedly attached to fastener 86. However, the bolt 80 includes a non-threaded section 88. A head 90 of the bolt 80 is of a particularly preferred configuration, with rounded ends and generally flat opposite sides, as illustrated, which is received within a similarly shaped recess 92 of the mount block 82, such that the head 90 lies generally flush with an upper surface of the bottom of the V-shaped channel 72. The flat edges of the bolt head 90 and recess 92 create engaging surfaces, wherein as the mount block 82 is rotated, the bolt 80 can also be rotated. Fastener 86 is of a type which fastens onto the end 84 of the bolt 80, but enables the bolt 80 to be rotated with respect thereto while still remaining fastened to one another. A washer 94 may be disposed between the fastener 86 and the underside of the crossbar 68 or 70.

A fastening bolt 96 extends through washer 98, fastener 86, washer 94, elongated aperture 78, and through the hollow passageway 100 of bolt 80. Bolt 80 includes a segment of internal threads 102 therein which threadedly receive external threads 104 of fastening bolt 96. The fastening bolt 96 is threaded through this internally threaded section 102 so that a non-threaded section 106 of the fastening bolt 96 extends through bolt 80, mounting block, 82, crossbar 68 or 70, and fastener 86. In this manner, the fastening bolt 96 can be manually slid upwardly and downwardly, with the internal threads 102 of bolt 80 preventing the fastening bolt 96 from freely falling therethrough. However, the fastening bolt 96 can be intentionally removed by pulling fastening bolt 96 downwardly and turning the fastening bolt 96 so as to pass through the threaded section 102 of bolt 80 and be removed from the assembly. Typically, however, once the fastening bolt 96 has been passed through the assembly, as illustrated in FIG. 12, it is retained in this position, awaiting attachment of a rail segment 34. In particularly preferred embodiment, a handle 108 is attached to or formed at an end of the fastening bolt 96 so as to facilitate its manual rotation, both through the adjustable mount assembly 18 as well as into the rail segment 34.

As illustrated in FIGS. 5-7, the rail segments 34 include an internally threaded aperture 110, or a threaded insert disposed within the wall of the rail segment 34. This internally threaded aperture 110 is positioned at a predetermined distance from the end of the rail segment 34 which is to be connected to an adjoining rail segment 34. As such, when the attached rail segments 34, forming an inner or outer rail 12 or 14 are placed within the mounts 18 and 20, such that the junction between the rail segments 34 rest within the centering mount 20, the internally threaded apertures or plugs 110 are generally aligned with the through hole 100 of the bolt 80 and mount block 82, such that the threaded end 104 of the fastening bolt 96 can be threadedly inserted therein so as to attach the adjustable mount 18 to the rail. It will be appreciated that the distance between bolt or fastener 74 of the centering mount 20 and the fastening bolt 96 of the adjustable mount 18 generally corresponds with the distance between an end of the rail segment 34 forming the junction between the joined rail segments 34 and the threaded internal aperture 110.

In this manner, each adjustable mount 18, on either side of fixed centering mount 20 is fastened to the respective rail segment 34, and thus the inner or outer rail 12 or 14. The fastening bolt 96 is fastened to the rail segment by turning handle 108 until a firm connection is made and the rail is brought into firm contact with generally opposite surfaces of the recess 74 of the mount.

Figure 14:
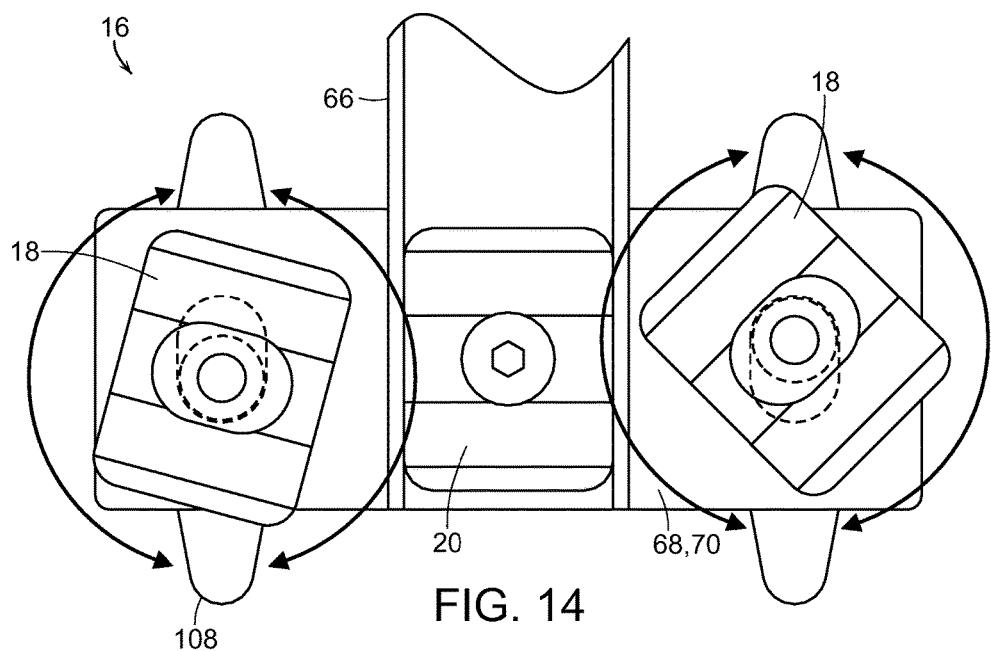
FIG. 14 is a top view similar to FIG. 13, illustrating rotation of the adjustable mounts, in accordance with the present invention.

However, before the fastening bolt 96 is fully fastened and tightened to the rail segment 34, as described above, the adjustable mount 18 may be rotated, as illustrated in FIG. 14, as necessary in order to receive and adjust the inner or outer rail 12 or 14. The adjustable mount 18 may be rotated so as to receive the inner or outer rail 12 or 14, and then upon partial attachment of the fastening bolt 96, and thus the adjustable mount 18, to the inner or outer rail 12 or 14, the adjustable mount 18 may be rotated, or slidably moved as described above, so that the inner or outer rail 12 or 14 is properly centered and positioned so that the desired distance between the inner and outer rails 12 and 14 is generally consistent and the rollers 30 and 32 of the slider dolly 26 can engage therewith and slidably move thereon. Adjustment of the adjustable mounts 18 may be done manually by pushing, pulling or rotating the mounts 18, or by means of a mallet or hammer or the like. However, the adjustability of the mounts 18, and thus the inner and outer rails 12 and 14 is particularly important for centering the rails 12 and 14, and creating the proper spacing between the rails 12 and 14 such that the slider dolly 26 can smoothly roll and slide on the track formed thereby.

When in the proper and desired position, the fastening bolt 96 can be completely and fully fastened to the rail segment 34 so as to lock the rail segment 34 in place to the adjustable mount 18, which due to the compression of the parts due to the final fastening thereof will hold and fix the rails 12 or 14, mounts 18 and support crossbars 68 and 70 firmly in place. Final adjustments can be made, as necessary, by loosening the fastening bolt 96 and turning, pushing, pulling, etc. the adjustable mount 18, and thus the attached rail 12 or 14 into the desired position, whereupon the rail 12 or 14 can then be firmly attached in place by fully fastening the fastening bolt 96.

The track assembly 10 can then be disassembled by reversing the steps described above with respect to its assembly. The inner and outer rails 12 and 14 can be removed from the supports 16 and the individual rail segments can be detached from one another. Support 16 can then be removed, as necessary, from stands 22. The aggregation of components can then be easily placed in bags or other containers for transportation and storage. The assembly and disassembly of the track system 10 can be done manually without any tools or specialized training in a quick and convenient manner.

Although several embodiments have been described in detail for purposes of illustration, various modifications may be made without departing from the scope and spirit of the invention. Accordingly, the invention is not to be limited, except as by the appended claims.

What is claimed is:

1. A collapsible curved support track system for a camera slider dolly, comprising:
    a plurality of curved inner rail segments having an outer configuration enabling a first set of rollers of a camera slider dolly to smoothly roll thereon;
    a plurality of curved outer rail segments having an outer configuration enabling a second set of rollers of the camera slider dolly to smoothly roll thereon;
    connectors disposed within adjacent open ends of the inner rail segments and adjacent open ends of the outer rail segments to manually detachably connect the inner rail segments to one another to form a curved inner rail and manually detachably connect the outer rail segments to one another to form a curved outer rail; and
    a plurality of supports in spaced relation for supporting the inner and outer rails to form a generally parallel curved track, at least one support having first mounts configured to removably receive a portion of the inner rail, and second mounts spaced from the first mounts and configured to removably receive portions of the outer rail, the first and second mounts being spaced apart from another so as to arrange the inner rail in generally parallel spaced relation to the outer rail a distance corresponding to a distance between the spaced apart first and second rollers of the camera slider dolly;
    wherein a plurality of the first and second mounts are adjustable to enable adjustment of the inner or outer rail associated therewith.

2. The system of claim 1, wherein the inner and outer rail segments each comprise a smooth, generally arcuate surface for receiving the slider dolly rollers thereon.

3. The system of claim 1, wherein the connectors comprise a male connector manually insertable into a female connector of an adjacent rail segment.

4. The system of claim 3, wherein each male connector includes a spring-loaded pin and each female connector includes a recess for receiving the spring-loaded pin therein.

5. The system of claim 1, wherein the support comprises a beam having first and second spaced apart crossbars positioned generally parallel to one another corresponding to a distance between the inner and outer rails.

6. The system of claim 5, wherein the first cross bar supports first inner rail mounts thereon and the second crossbar supports second outer rail mounts thereon.

7. The system of claim 5, including a height adjustable stand having a ground engaging base at one end thereof and coupled to the support at a generally opposite end thereof.

8. The system of claim 6, including a centering mount disposed between adjustable mounts in fixed position with respect to the support.

9. The system of claim 1, wherein at least a plurality of the first and second mounts are capable of rotational and planar movement to enable adjustment of the inner or outer rails.

10. The system of claim 1, wherein the mounts include a generally V-shaped, open-faced recess for receiving a portion of the rail segment therein.

11. The system of claim 1, including a bolt extendible through the adjustable mounts and into a threaded aperture of the rail segment to attach the rail segment to the mount.

12. The system of claim 11, including a handle at an end of the bolt for manually fastening the bolt and rail to one another.

13. A collapsible curved support track system for a camera slider dolly, comprising:
    a plurality of curved inner rail segments having a generally smooth, arcuate surface enabling a first set of rollers of a camera slider dolly to smoothly roll thereon;
    a plurality of curved outer rail segments having a generally smooth, arcuate surface enabling a second set of rollers of the camera slider dolly to smoothly roll thereon;
    connectors disposed within adjacent open ends of the inner rail segments and adjacent open ends of the outer rail segments to manually detachably connect the inner rail segments to one another to form a curved inner rail and manually detachably connect the outer rail segments to one another to form a curved outer rail; and
    a plurality of supports in spaced relation for supporting the inner and outer rails, at least one support comprising a beam having first and second crossbars in spaced and generally parallel relation to one another, and a plurality of first mounts associated with the first crossbar and a plurality of second mounts associated with the second crossbar, the first mounts being configured to receive a portion of the inner rail and the second mounts being configured to receive a portion of the outer rail so as to arrange the inner rail in generally parallel spaced relation to the outer rail corresponding to a distance between the spaced apart first and second rollers of the camera slider dolly;

wherein a plurality of the first and second mounts are capable of rotational and planar movement to enable adjustment of the inner or outer rail.

14. The system of claim 13, wherein the connectors comprise a male connector manually insertable into a female connector of an adjacent rail segment.

15. The system of claim 14, wherein each male connector includes a spring-loaded pin and each female connector has a recess configured to receive the spring-loaded pin therein.

16. The system of claim 13, including a height adjustable stand having a ground engaging base at one end thereof and coupled to the support at a generally opposite end thereof.

17. The system of claim 13, including a centering mount in fixed position disposed between adjustable mounts on the support.

18. The system of claim 13, wherein the mounts include a generally V-shaped, open-faced recess for receiving a portion of the rail segment therein.

19. The system of claim 13, including a bolt extendible through the adjustable mounts and into a threaded aperture of the rail segment and a handle at an end of the bolt for manually fastening the bolt and rail to one another.

20. A collapsible curved support track system for a camera slider dolly, comprising:
   a plurality of curved inner rail segments having a generally smooth, arcuate surface enabling a first set of rollers of a camera slider dolly to smoothly roll thereon;
   a plurality of curved outer rail segments having a generally smooth, arcuate surface enabling a second set of rollers of the camera slider dolly to smoothly roll thereon;
   connectors disposed within adjacent open ends of the inner rail segments and adjacent open ends of the outer rail segments to manually detachably connect the inner rail segments to one another to form a curved inner rail and manually detachably connect the outer rail segments to one another to form a curved outer rail;
   a plurality of stands in spaced relation, each stand including a ground engaging base at one end thereof and a support at a generally opposite end thereof for supporting the inner and outer rails, at least one support comprising a beam having first and second crossbars in spaced and generally parallel relation to one another; and
   a plurality of first mounts associated with the first crossbar and a plurality of second mounts associated with the second crossbar, the first mounts having a generally V-shaped, open-faced recess configured to receive a portion of the inner rail and the second mounts having a generally V-shaped, open-faced recess configured to receive a portion of the outer rail so as to arrange the inner rail in generally parallel spaced relation to the outer rail corresponding to a distance between the spaced apart first and second rollers of the camera slider dolly;
   wherein the connector each comprise a male connector manually insertable into a female connector of an adjacent rail segment, the male connector including a spring-loaded pin insertable into a recess formed in the female connector;
   wherein a plurality of the first and second mounts are adjustable and capable of rotational and planar movement to enable adjustment of the inner or outer rail; and
   wherein the adjustable mounts include a bolt extendible through the mount and into a threaded aperture of the rail and a handle at one end of the bolt to manually to fasten the rail to the mount.

21. The system of claim 20, including a centering mount in fixed position disposed between adjustable mounts on the support.

* * * * *